Sept. 15, 1936.　　　W. A. BEHR　　　2,054,236
FISHHOOK EXTRICATOR
Filed Nov. 1, 1935
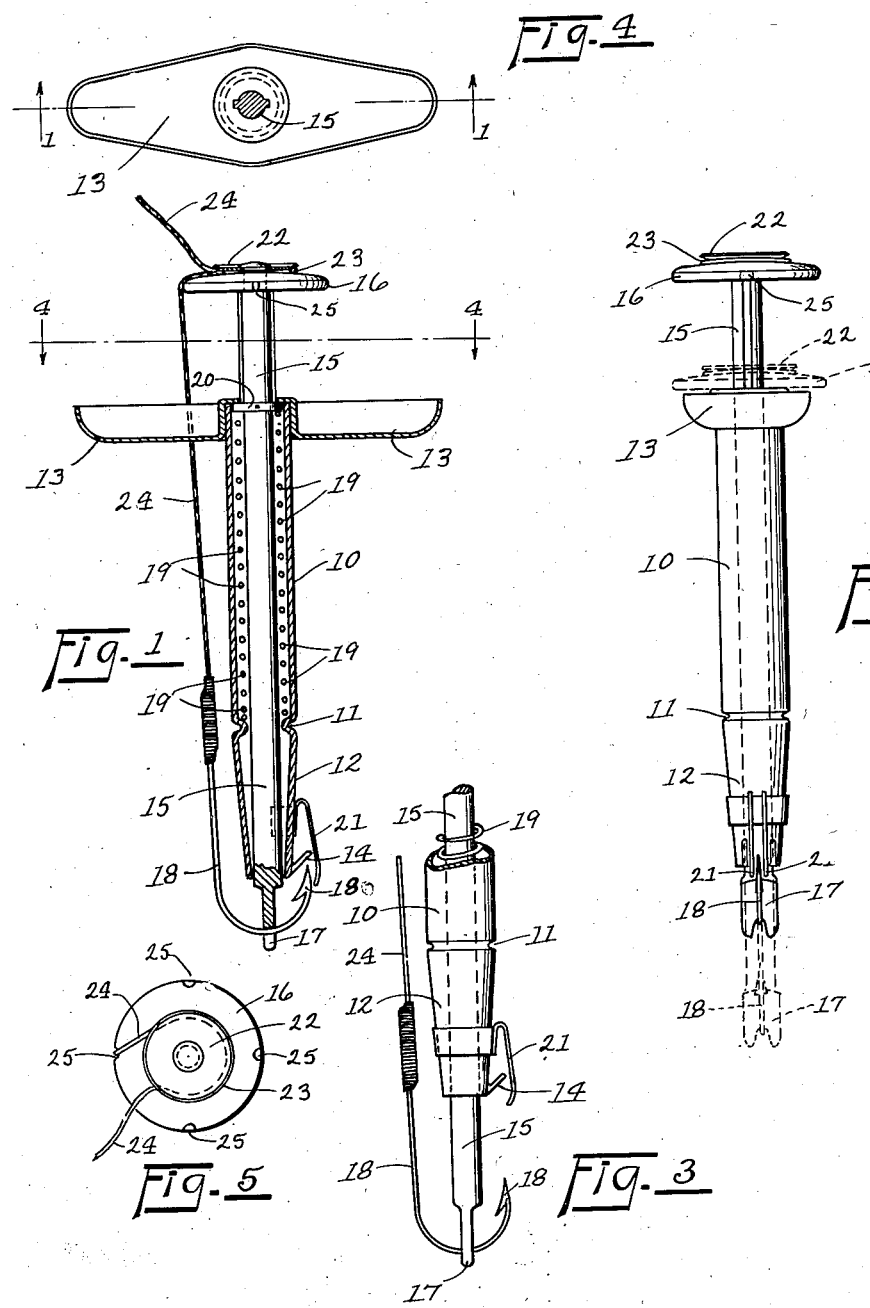
INVENTOR.
Walter A. Behr
BY
ATTORNEYS.

Patented Sept. 15, 1936

2,054,236

UNITED STATES PATENT OFFICE 2,054,236

FISHHOOK EXTRICATOR

Walter A. Behr, Flint, Mich.

Application November 1, 1935, Serial No. 47,739

6 Claims. (Cl. 43—29)

The instant invention relates to fish hook extricators and more particularly to certain improvements over the extricator shown and described in United States Letters Patent No. 1,777,695, issued October 7, 1930.

The primary objects of the present invention are to provide a device of the character above indicated which is efficient and effective in use; to provide such a device which is rugged and sturdy in construction; and, to provide such a device which is economical in manufacture.

An illustrative embodiment of the invention is shown in the accompanying drawing, wherein:

Figure 1 is a longitudinal central sectional view of the extricator on line 1—1 of Figure 4;

Figure 2 is a side elevational view thereof in a quarter turned position from that shown in Figure 1 and showing in dotted lines the position of the plunger thereof in its projected position against the tension of the helical compression spring;

Figure 3 is a fragmentary side elevational view showing the plunger in its manually projected position against the tension of the helical compression spring;

Figure 4 is a sectional view on line 4—4 of Figure 1; and

Figure 5 is a top plan view of the manually operable handle and showing the manner in which the line may be wrapped to hold it taut.

Referring to the drawing in which like parts of the device there shown are designated by the same numerals in the several views, the fish hook extricator comprises a tubular housing 10, preferably of metal, provided with an exterior annular groove 11 at its inwardly tapering end 12. A cross arm 13 adapted for grasping by the fingers of the operator here shown as a plate and preferably of stamped sheet metal is rigidly fixed or secured adjacent one end of the tubular housing in any suitable manner and an up-turned stripper hook 14 is fixedly secured to or integrally formed with the opposite or tapered end 12 thereof.

A plunger or push rod 15 is longitudinally slidably disposed within the housing and projects exteriorly of the housing at both ends thereof. A dome shaped knob 16 forming a handle is rigidly and transversely fixed to one end of the exteriorly projecting plunger 15 in any suitable manner and the opposite end of the plunger is provided with a bifurcated portion 17 for engaging a fish hook 18 within the throat or gullet of a fish preparatory to extricating the hook and as shown in Figures 1 and 2.

A helical compression spring 19 disposed within the housing 10 and encircling the plunger 15 is retained therein between the indentation formed by the annular groove 11 and a transverse disc 20 rigidly fixed to the plunger 15.

A pair of guard prongs 21 whose function is hereinafter described, overhang the stripper hook 14 and depend from the tapered end 12 of the housing 10 and a flat washer 22 is riveted or otherwise fixed to the top of the dome shaped handle 16 providing an annular groove 23 within which the line 24 may be wound and slidably retained as indicated in Figures 1 and 5 for the purpose presently to be described.

Operation

In operation, the device is inserted in the mouth of the fish with the bifurcated end 17 in engagement with the hook 18 as shown in Figures 1 and 2. The line 24 is then wound or wrapped within the annular groove 23 formed between the dome shaped handle 16 and the washer 22 in a taut position as shown in Figure 1 and as indicated in Figure 5.

The stripper hook 14 is caused to engage within the gullet of the fish and the manual compressing of the handle 16, between the heel of the hand and the fingers of the operator grasped over the cross arm 13, causes the plunger 15 and the hook 18 to move to the position shown in dotted lines in Figure 2, the taut line 24 slipping in the annular groove 23 during the outward movement of the plunger 15 against the tension of the expanded compression spring. The hook 18 is thus dislodged from the gullet of the fish and as it is extricated therefrom the guard prongs 21 prevent the hook from becoming re-engaged during withdrawal of the device.

It will thus be seen that the fish hook extricator herein shown and described is an improvement over the device shown in United States Patent No. 1,777,695, issued October 7, 1930, and that the device is efficient and effective in use, rugged and sturdy in construction and economical in manufacture.

It will be understood of course that the dome shaped handle 16 may be provided with a plurality of peripheral radial notches 25 about its marginal edge as shown in Figure 5 instead of with the annular grooves 23 and within which notches the line 24 may be retained taut by the palm or heel of the hand of the operator, and while but one specific embodiment of this invention has been herein shown and described, it will be understood that numerous details of the construction shown may be altered or omitted without departing from the spirit of this invention as defined by the following claims.

I claim:

1. A fish hook extricator comprising a tubular housing having a cross arm, a plunger longitudinally slidably disposed within the housing having a handle at one end thereof projecting exteriorly of the housing and a bifurcated fish hook engaging portion at the other end thereof projecting exteriorly of the housing, and a helical compression spring within the housing encircling the plunger adapted to be expanded upon compression of the handle toward the cross arm.

2. A fish hook extricator comprising a tubular housing having a cross arm fixed adjacent one end thereof and a stripper hook fixed adjacent the other end thereof, a plunger longitudinally slidably disposed within the housing having a handle at one end thereof projecting exteriorly of the housing and a bifurcated fish hook engaging portion at the other end thereof projecting exteriorly of the housing, and a helical compression spring within the housing encircling the plunger adapted to be expanded upon compression of the handle toward the cross arm.

3. A fish hook extricator comprising a tubular housing having a cross arm fixed adjacent one end thereof and a stripper hook fixed adjacent the other end thereof, guard prongs overhanging the stripper hook and depending from the housing, a plunger longitudinally slidably disposed within the housing having a handle at one end thereof projecting exteriorly of the housing and a bifurcated fish hook engaging portion at the other end thereof projecting exteriorly of the housing, and a helical compression spring within the housing encircling the plunger adapted to be expanded upon the compression of the handle toward the cross arm.

4. A fish hook extricator comprising a tubular housing having a cross arm, a plunger longitudinally slidably disposed within the housing having a handle at one end thereof projecting exteriorly of the housing and a bifurcated fish hook engaging portion at the other end thereof projecting exteriorly of the housing, said handle having a line retaining groove, and a helical compression spring within the housing encircling the plunger adapted to be expanded upon compression of the handle toward the cross arm.

5. A fish hook extricator comprising a tubular housing having a cross arm fixed adjacent one end thereof and a stripper hook fixed adjacent the other end thereof, a plunger longitudinally slidably disposed within the housing having a handle at one end thereof projecting exteriorly of the housing and a bifurcated fish hook engaging portion at the other end thereof projecting exteriorly of the housing, said handle having a line retaining groove, and a helical compression spring within the housing encircling the plunger adapted to be expanded upon compression of the handle toward the cross arm.

6. A fish hook extricator comprising a tubular housing having a cross arm fixed adjacent one end thereof and a stripper hook fixed adjacent the other end thereof, guard prongs overhanging the stripper hook and depending from the housing, a plunger longitudinally slidably disposed within the housing having a handle at one end thereof projecting exteriorly of the housing and a bifurcated fish hook engaging portion at the other end thereof projecting exteriorly of the housing, said handle having a line retaining groove, and a helical compression spring within the housing encircling the plunger adapted to be expanded upon compression of the handle toward the cross arm.

WALTER A. BEHR.